No. 635,591.  
R. RASMUSSEN.  
SUPPORT FOR AGRICULTURAL TOOLS.  
(Application filed May 1, 1899.)  
Patented Oct. 24, 1899.
(No Model.)
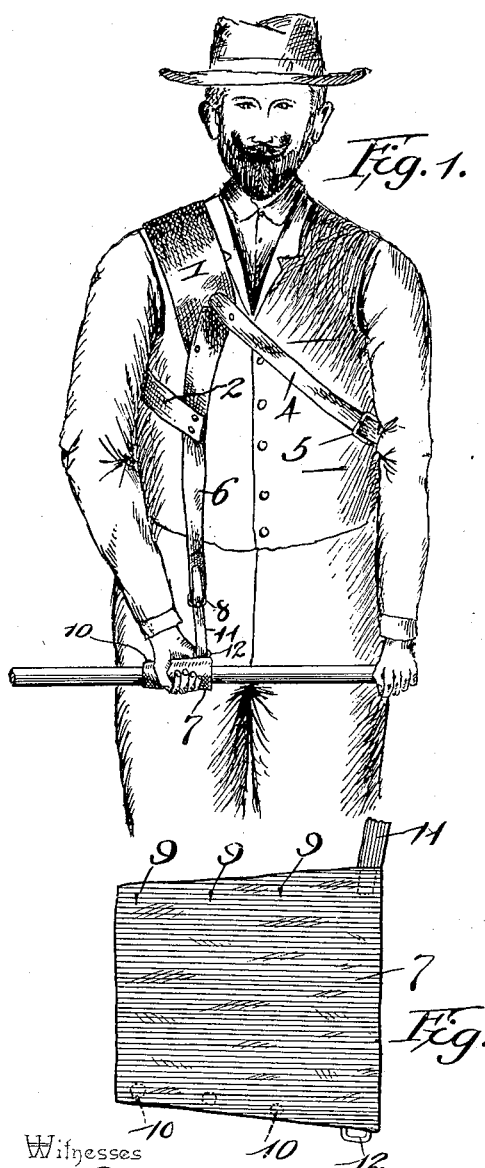
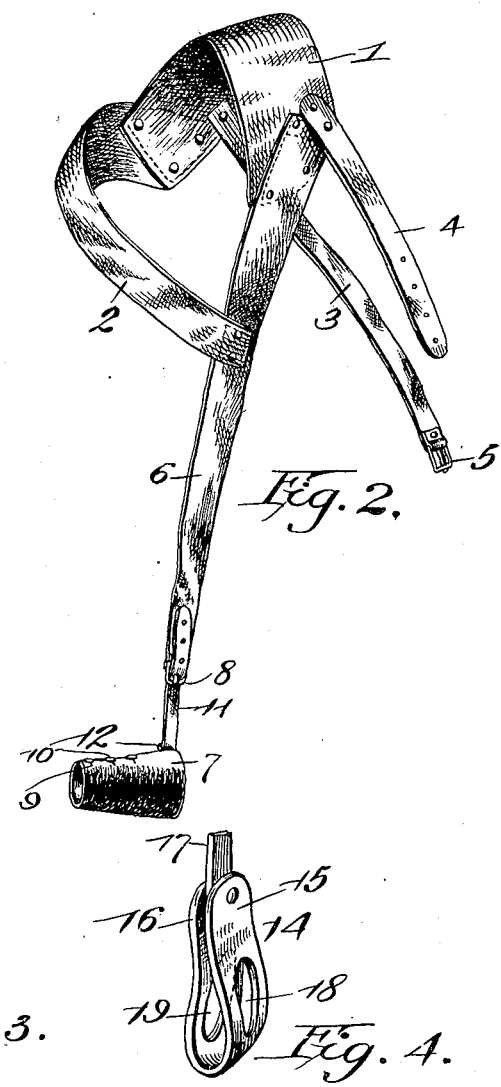
Rasmus Rasmussen, Inventor.

UNITED STATES PATENT OFFICE.

RASMUS RASMUSSEN, OF OREGON, WISCONSIN.

SUPPORT FOR AGRICULTURAL TOOLS.

SPECIFICATION forming part of Letters Patent No. 635,591, dated October 24, 1899.

Application filed May 1, 1899. Serial No. 715,180. (No model.)

*To all whom it may concern:*

Be it known that I, RASMUS RASMUSSEN, a citizen of the United States, residing at Oregon, in the county of Dane and State of Wisconsin, have invented a new and useful Support for Pitchforks, Shovels, and Like Implements, of which the following is a specification.

This invention relates to supports for pitchforks, shovels, and like implements; and the object thereof is to provide a harness adapted to be worn by the operator and carrying the implement, whereby the hand and arm of the operator is greatly relieved from the strain occasioned by the use of such implements.

A further object is to protect the operator's hand against being blistered by frictional contact with the handle of the implement.

With these objects in view the present invention consists in the combination and arrangement of parts, as will be hereinafter more fully described, shown in the accompanying drawings, and particularly pointed out in the appended claims.

In the drawings, Figure 1 is a perspective view of the device applied in use. Fig. 2 is an enlarged detail perspective view of the device. Fig. 3 is a detail view of the hand-protector. Fig. 4 is a detail perspective view of a modified form of hand-protector.

The same numerals of reference are used to designate like and corresponding parts in the several figures of the drawings.

Referring to the accompanying drawings, and particularly to Fig. 2 thereof, it will be seen that the harness comprises a comparatively broad and flat shoulder-strap 1, an armpit-strap 2, a back-strap 3, and a breast-strap 4. These several straps are connected together at their adjacent ends by means of rivets or stitching, as desired, so as to form a strong and durable connection between the parts.

As illustrated in Fig. 1, it will be noted that the shoulder-strap fits evenly across the shoulder and extends from front to rear, the armpit-strap beneath the arm a suitable distance in front thereof, while the back-strap extends obliquely downward and beneath the other arm and upward across the body of the person and is adjustably connected to the breast-strap by means of a suitable buckle 5. Pendent from the front end of the shoulder-strap is the supporting-strap 6, which carries at its lower end the hand-protector 7. The front end of the armpit-strap is connected to this supporting-strap 6 at a suitable distance below the upper end thereof, so that said armpit-strap may rest flat against the body of the person, and thereby provide a neat fit for the harness.

The hand-protector is preferably made of leather in the form of a sleeve open at both ends and larger at one end than at the other. An adjustable connecting-strap 11 is provided at the larger and rear end of the hand-protector and is connected to the supporting-strap 6 by means of a buckle 8, carried by the latter strap.

In the operation of the device the harness is fitted to the body of the operator, as hereinbefore described, and the handle of the implement is slidably received within the hand-protector. The latter is grasped by the hand and the implement is manipulated as usual, the hand and hand-protector being capable of sliding upon the handle of the implement in the operation thereof. It will be apparent that the hand-protector receives the wear and friction, and this relieves the hand of such injurious effects. As the handle is carried by the hand-protector the weight of the implement is supported by the shoulder of the operator and his arm and hand are greatly relieved of the strain usually consequent in the operation of shovels and similar implements.

By reference to Fig. 3 it will be seen that the hand-protector is formed from a flat piece of leather having buttonholes 9 provided in one longitudinal edge and buttons 10 along the opposite edge, whereby the protector may be buttoned about the handle instead of being slipped over the end thereof. The purpose of this arrangement is to facilitate the application of the hand-protector to the handle of a shovel or other implement having the outer end thereof enlarged.

The hand-protector is provided with an adjustable connecting-strap 11, secured to one side only of the same and at the enlarged rear end thereof, and is adapted to be passed through a suitable eye 12, provided upon the opposite edge of the leather piece, whereby the rear ends of the longitudinal edges are effectively held together. The connecting-strap 11 is connected to the pendent supporting-strap 6 by means of the buckle 8, carried by the latter strap and permitting of a vertical adjustment of the hand-protector to fit the device to persons of different sizes.

A modified form of hand-protector is illustrated in Fig. 4 and is made from a single piece of leather 14, having its opposite ends 15 16, respectively, folded together to form a loop, and the connecting-strap 17 being arranged between the ends of the leather piece and secured thereto by the single fastening which connects the ends of the leather piece. The opposite sides of the loop are provided with openings 18 and 19, respectively, alined transversely of the loop and adapted to receive the thumb of the hand which grasps the hand-protector. One of these openings, as 19, is preferably larger in diameter than the other to accommodate the base or thickened portion of the thumb. It will be understood that this form of hand-protector is adapted to receive the handle of the implement within the loop, and the thumb of the operator is engaged through the thumb-openings 18 and 19 and over the top of the handle, whereby the handle may be effectively held in the hand and is supported by the loop.

It will be understood that supporters will be provided for the left side of the operator, as well as the right side thereof, and by the employment of the buckles a single device may be adjusted to operators of different sizes, and other changes in the form, proportion, size, and the minor details of construction, within the scope of the appended claims, may be resorted to without departing from the spirit or sacrificing any of the advantages of this invention.

What I claim is—

1. In a device of the class described, the combination of a body-harness, a pendent supporting-strap, and a hand-protector carried at the lower end of the supporting-strap and adapted to receive the handle of an implement, substantially as and for the purpose set forth.

2. In a device of the character described, the combination of a body-harness, a pendent supporting-strap, and a hand-protector comprising a sleeve open at both ends and having an adjustable connection with the supporting-strap, substantially as and for the purpose set forth.

3. In a device of the character described, the combination of a body-harness, a pendent supporting-strap, and a hand-protector carried thereby, said protector being formed from a single piece of leather or other flexible material having means for connecting its opposite longitudinal edges, whereby the sleeve may be formed, a connecting-strap provided upon one of the edges and adapted to be passed through an eye provided upon the opposite edge of the sleeve and having an adjustable connection with the supporting-strap, substantially as and for the purpose set forth.

4. In a device of the character described, the combination with a body-harness comprising a shoulder-strap, an armpit-strap, a back-strap and a breast-strap, of a supporting-strap pendent from the front end of the shoulder-strap, and a hand-protector carried by the supporting-strap and adapted to slidably receive the handle of an implement, substantially as and for the purpose set forth.

5. In a device of the character described, the combination with a body-harness comprising a comparatively broad flat shoulder-strap adapted to engage over the shoulder of the operator from front to rear, an armpit-strap connected to the rear end of the shoulder-strap and adapted to pass beneath the arm and in front thereof, a back-strap connected to the shoulder-strap and adapted to pass obliquely downward across the back of the operator and beneath his opposite arm and upward across the front of his body, and a breast-strap connected to the forward end of the shoulder-strap and having an adjustable connection with the free end of the back-strap, whereby the harness may be fitted to the operator, of a supporting-strap pendent from the front end of the shoulder-strap, and a hand-protector carried at the lower end of the supporting-strap, the front end of the armpit-strap being connected to the pendent supporting-strap, substantially as and for the purpose set forth.

In testimony that I claim the foregoing as my own I have hereto affixed my signature in the presence of two witnesses.

RASMUS RASMUSSEN.

Witnesses:
H. M. HASKELL,
J. W. EMMONS.